(12) United States Patent
Kumamoto

(10) Patent No.: US 9,134,879 B2
(45) Date of Patent: Sep. 15, 2015

(54) GRAPHICAL USER INTERFACE FOR DISPLAYING HISTORIES OF SETTING PANELS IN A STACK VIEW FOR EASY MANIPULATION

(71) Applicant: Danny Naoshi Kumamoto, Garden Grove, CA (US)

(72) Inventor: Danny Naoshi Kumamoto, Garden Grove, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 244 days.

(21) Appl. No.: 13/632,017

(22) Filed: Sep. 30, 2012

(65) Prior Publication Data

US 2014/0096065 A1     Apr. 3, 2014

(51) Int. Cl.
  *G06F 3/048*     (2013.01)
  *G06F 3/0481*    (2013.01)
  *G06F 3/0482*    (2013.01)
  *G06F 3/0484*    (2013.01)

(52) U.S. Cl.
  CPC ............ *G06F 3/0481* (2013.01); *G06F 3/0482* (2013.01); *G06F 3/04847* (2013.01)

(58) Field of Classification Search
  CPC ...................................................... G06F 3/048
  USPC ................................................. 715/779, 797
  See application file for complete search history.

(56) References Cited

U.S. PATENT DOCUMENTS

| | | | |
|---|---|---|---|
| 4,759,636 A * | 7/1988 | Ahern et al. ..................... 367/21 |
| 5,651,107 A * | 7/1997 | Frank et al. ................... 715/768 |
| 6,750,890 B1 * | 6/2004 | Sugimoto ..................... 715/838 |
| 8,166,415 B2 * | 4/2012 | Cisler et al. ................... 715/778 |
| 2005/0280856 A1 * | 12/2005 | Kim et al. .................... 358/1.13 |
| 2006/0090143 A1 * | 4/2006 | Tanaka .......................... 715/810 |
| 2008/0151277 A1 * | 6/2008 | Park .............................. 358/1.9 |
| 2012/0173976 A1 * | 7/2012 | Herz et al. .................... 715/716 |

FOREIGN PATENT DOCUMENTS

| | | |
|---|---|---|
| JP | 2004-21438 | 1/2004 |
| JP | 2008-191790 | 8/2008 |

* cited by examiner

*Primary Examiner* — Matthew Ell
(74) *Attorney, Agent, or Firm* — Chen Yoshimura LLP

(57) ABSTRACT

A user interface display method that facilitates setting of various setting parameters for controlling an application program and preserving past values of the setting parameters as historical snapshots. When a setting panel is displayed and the user modifies setting parameter values in the setting panel and saves the new values, the pre-modified setting parameter values are saved as a historical snapshot, and the modified values are saved as the current setting parameters for controlling the program. Historical snapshots of setting panels that have been saved in the past can be displayed simultaneously with the current setting panel in a manner that visually simulates a stack of panels. The user can select any one of the historical panels in the stack, modify the setting values in that panel, and save the modified values as the current settings while keeping the historical snapshot.

2 Claims, 10 Drawing Sheets

GRAPHICAL USER INTERFACE FOR DISPLAYING HISTORIES OF SETTING PANELS IN A STACK VIEW FOR EASY MANIPULATION

BACKGROUND OF THE INVENTION

1. Field of the Invention

This invention relates to a method and related apparatus for a graphical user interface, and in particular, it relates to storing and displaying historical values of a setting panel for an application program and restoring past setting values.

2. Description of Related Art

In many application programs, dialog windows (also referred to as panels, boxes, screens, panes, etc.) are used for interacting with users and allowing users to input various setting values for the programs. Examples include properties setting in a printer driver or other driver program, options or preference setting in a web browser or email program, format settings in a content processing program that creates and manipulates contents such as text and non-text objects, etc. While these settings displays may be referred to by different names in different programs (they are referred to as setting panels in this disclosure), they share many essential common features, as illustrated in the example of a properties setting panel for a printer driver shown in FIG. 1A and the example of a paragraph format setting panel shown in FIG. 1B. The setting panel is a discrete area of display with defined boundaries and structured display contents such as various fields, check boxes, buttons and other input means at designed locations for interacting with a user. The input means allows the user to input various setting values for the application program. The setting values are displayed in the setting panel, and saved by the program, e.g. when the user clicks an "OK" or "Save" button of the setting panel. These saved values are used to control aspects of the program (printer driver in the example of FIG. 1A and word processing program in the example of FIG. 1B). In conventional programs, each time the user wishes to change the settings, the same procedure is followed; if the user wishes to change the settings back to some previous values, the user brings up the settings display and manually changes the values back to the previous values. (In the example of formatting, while some word processing program allows the user to undo a formatting change, it is not done by using the setting panel; further, if the user has typed in text after the formatting change, the user must undo the typing before undoing the formatting change, which is inconvenient.)

In a graphical user interface, presenting multiple display areas (e.g. windows) or multiple versions of a display area in a stacked manner is known. For example, in the backup program described in U.S. Pat. No. 8,166,415 (see FIGS. 7, 8 and 9-14 thereof), multiple snapshots of a window at different times are saved and then presented in a stack view. The user can navigate to one of the snapshot in the stack to view the backup of a particular day, and can initiated a restoration of the current view according to at least a portion of an earlier version. However, the displayed contents of snapshots (i.e. the icons in the snapshots) do not appear to be editable.

SUMMARY

The present invention is directed to a method and related apparatus for storing and recalling setting parameters in application programs.

An object of the present invention is to make it easy for the user to make changes to settings as well as recall and edit settings that have been used in the past.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented by a computer for manipulating setting parameters, which includes: (a) storing in the computer a plurality of sets of setting parameters, including a set of current setting parameters used to control a program and a plurality of sets of historical setting parameters; (b) simultaneously displaying a plurality of setting panels on a screen, including a current setting panel and a plurality of historical setting panels, each setting panel being rendered based on a corresponding set of current or historical setting parameters, each setting panel including a plurality of input means for interacting with a user; (c) receiving a first user input selecting one of the plurality of historical setting panels; (d) receiving a second user input via the input means of the selected historical setting panel; (e) in response to the second user input, generating a set of modified setting parameters by modifying the historical setting parameters corresponding to the selected historical setting panel based on the second user input; (f) keeping the set of current setting parameters as a new set of historical setting parameters and saving the set of modified setting parameters generated in step (e) as a new set of current setting parameters; and (g) controlling the program using the new set of current setting parameters.

In the above method, step (b) may include: displaying the plurality of setting panels as a stack of panels, wherein the current setting panel is displayed at a top of the stack and un-obscured by other setting panels and the plurality of historical setting panels are displayed below the current setting panel, wherein each of the plurality of historical setting panels has at least some of its input means un-obscured and some of its input means obscured by other setting panels.

In another aspect, the present invention provides a method implemented by a computer for manipulating setting parameters, which includes: (a) storing in the computer a set of current setting parameters used to control a program, including a first subset and second subset of current setting parameters; (b) storing in the computer a plurality of first subsets of historical setting parameters and a plurality of second subsets of historical setting parameters; (c) displaying a current setting panel on a screen, including: (c1) displaying a main setting panel; (c2) displaying a current first sub-panel within the main setting panel, the current first sub-panel being rendered based on the first subset of current setting parameters and including a plurality of input means for interacting with a user; and (c3) displaying a current second sub-panel within the main setting panel, the current second sub-panel being rendered based on the second subset of current setting parameters and including a plurality of input means for interacting with the user; (d) in response to a first user input, replacing the display of the current first sub-panel by a display of a historical first sub-panel, the historical first sub-panel being rendered based on a first subset of historical setting parameters and including a plurality of input means for interacting with the user; (e) in response to a second user input received via the input means of the historical first sub-panel, generating a modified first subset of setting parameters by modifying the first subset of historical setting parameters based on the second user input; (f) in response to a third user input, replacing the display of the current second sub-panel by a display of a historical second sub-panel, the historical second sub-panel being rendered based on a second subset of historical setting parameters and including a plurality of input means for interacting with the user; (g) in response to a fourth user input received via the input means of the historical second sub-panel, generating a modified second subset of setting parameters by modifying the second subset of historical setting parameters based on the fourth user input; (h) keeping the set of current setting parameters as a new set of historical setting parameters and saving the modified first and second subsets of setting parameters generated in steps (e) and (g) as a new set of current setting parameters; and (i) controlling the program using the new set of current setting parameters.

The method may further include: (j) in response to a fifth user input, replacing the display of the current setting panel by a display of a historical setting panel, including: (j1) displaying a main setting panel; (j2) displaying a historical first sub-panel within the main setting panel, the historical first sub-panel being rendered based on a first subset of historical setting parameters and including a plurality of input means for interacting with a user; and (j3) displaying a historical second sub-panel within the main setting panel, the historical second sub-panel being rendered based on a second subset of historical setting parameters and including a plurality of input means for interacting with the user; (k) in response to a sixth user input received via the input means of the historical first and second sub-panels, generating modified first and second subset of setting parameters by modifying the first and second subset of historical setting parameters based on the sixth user input; (l) keeping the set of current setting parameters as a new set of historical setting parameters and saving the modified first and second subsets of setting parameters generated in step (k) as a new set of current setting parameters; and (m) controlling the program using the new set of current setting parameters.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Various methods according to embodiments of the present invention provide a user interface display for setting various setting parameters for controlling an application program and preserving past values of the setting parameters as historical snapshots. More specifically, when a setting panel is displayed and the user modifies setting parameter values in the setting panel and saves the new values, the pre-modified parameter values are saved as a historical snapshot, and the modified values are saved as the current setting parameters for controlling the program. Historical snapshots of setting panels that have been saved in the past can be displayed simultaneously with the current setting panel in a manner that visually simulates a stack of panels. The top sheet is the current panel and is fully visible; each sheet in the stack below the top sheet is a historical panel and its contents are partially revealed. The panels in the stack may be arranged in a chronological order with newer ones above older ones, or in other orders. From the displayed stack of panels, the user may select any one of the historical panels in the stack, optionally edit the setting values in that panel, and then save them as the current settings.

In one aspect, the present invention provides a method that allows historical values of settings to be automatically saved when the user makes changes to the settings, and allows the saved historical values to be recalled by the user at a later time to be edited (optional) and used as the current settings to control a program.

In another aspect, the present invention provides a method for displaying a plurality of settings panels, include a current setting panel and a number of historical setting panels, in a stack view.

Figure 1A:
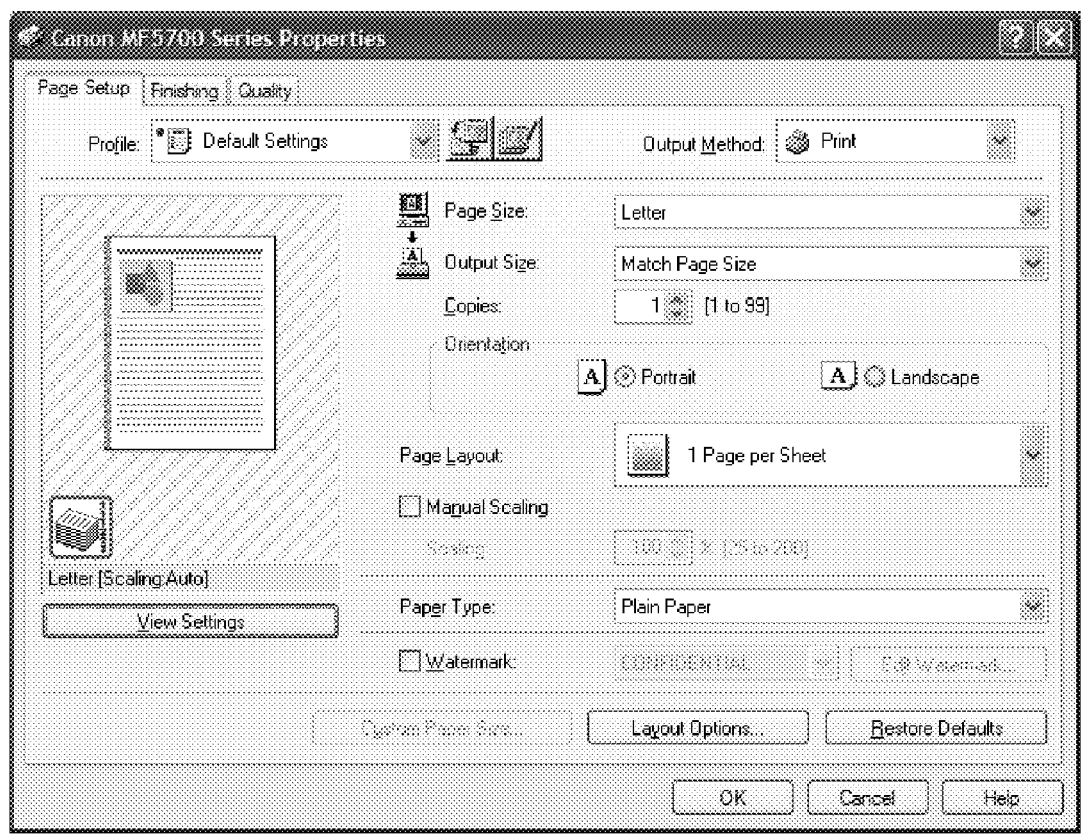
FIGS. 1A and 1B illustrate examples of conventional setting panels.
Figure 1B:
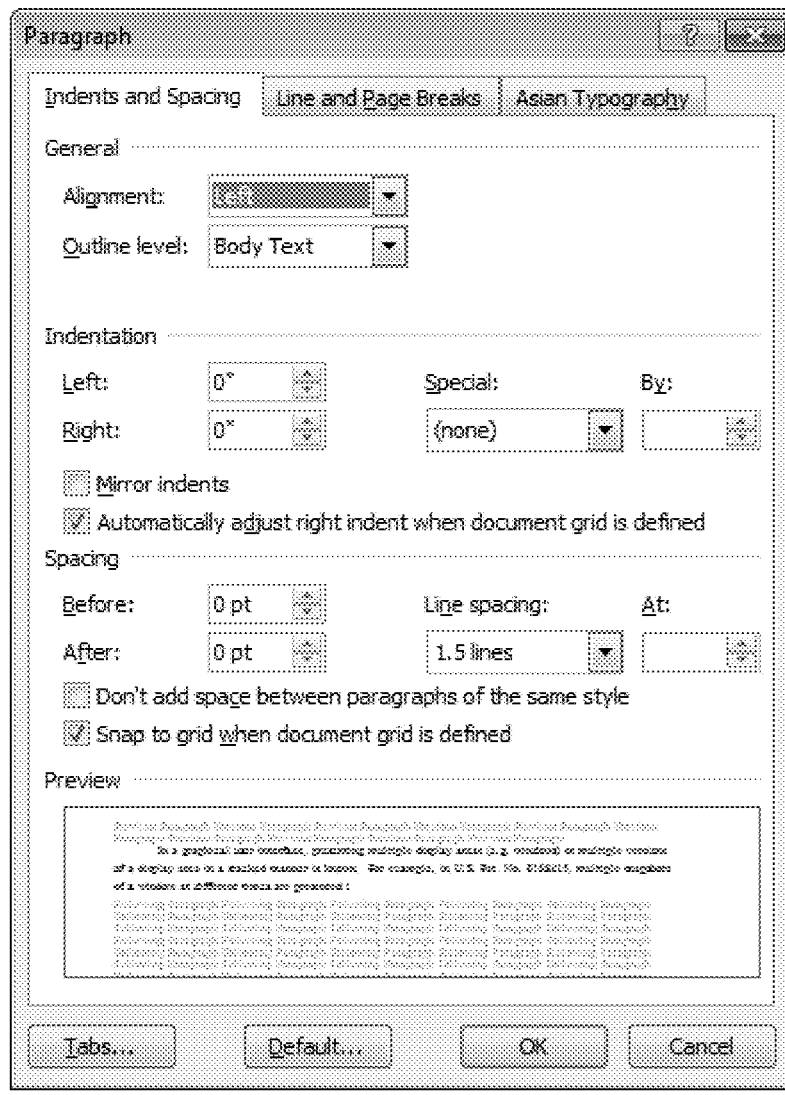
Figure 2:
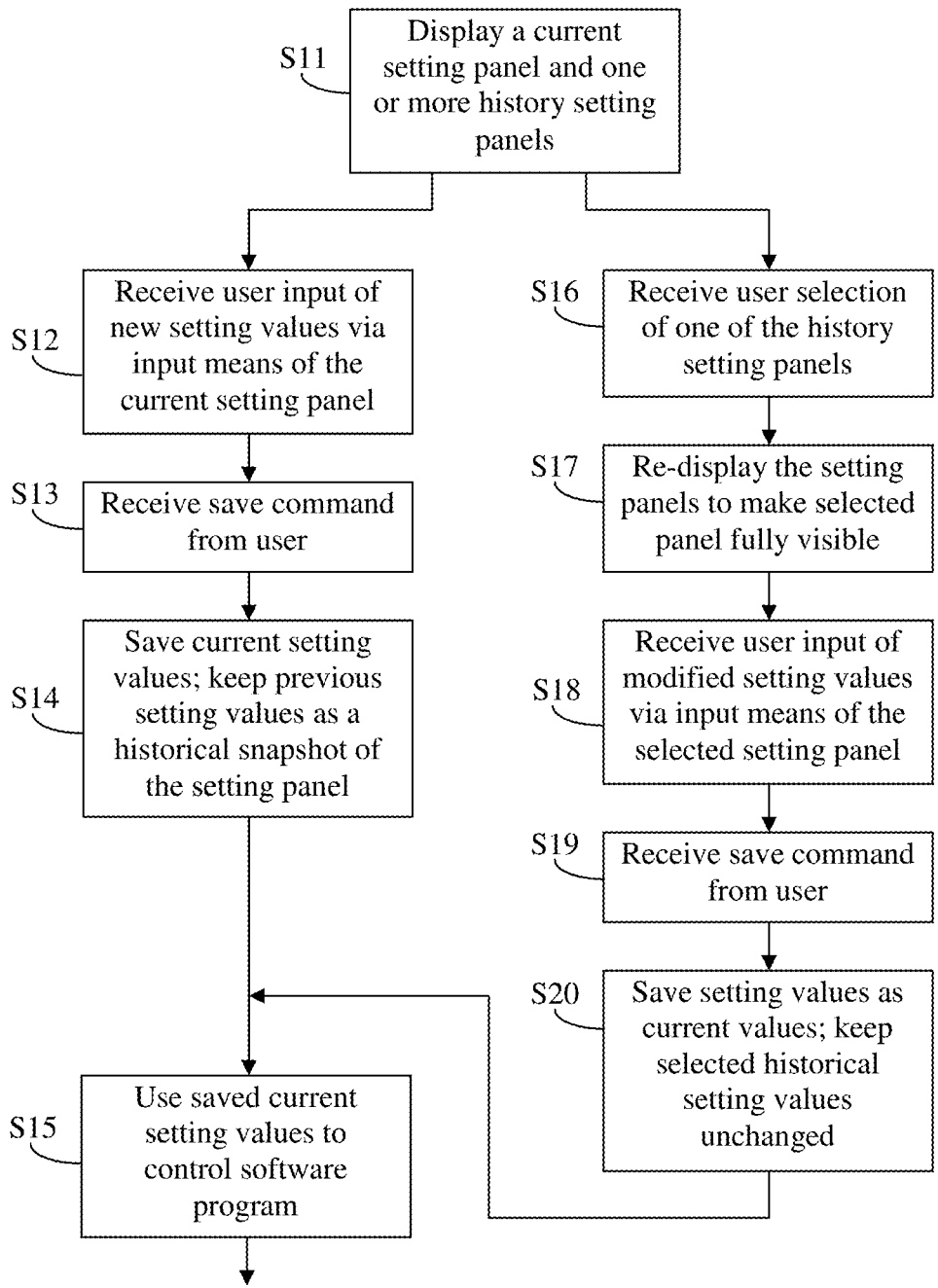
FIG. 2 schematically illustrates a user interface display method for handing setting panels according to an embodiment of the present invention.

FIG. 2 illustrates a setting panel display and modification method implemented by a software program according to an embodiment of the present invention. In response to a first user request, the program displays a setting panel (the current setting panel) on a screen (step S11). In this step, the program also displays historical setting panels, if available, as will be described in detail later. The first user request may be issued from an application program, for example, by pressing a "properties" button in a print driver dialog window. The setting panel typically has a structured display with various input means at designed locations (see the examples in FIGS. 1A and 1B). The input means may include but are not limited to, for example, buttons, check boxes, radio buttons, text or value input fields, drop-down lists, pop-up lists, icons, tabs for bringing up different sheets, etc., each of which optionally having displayed names associated with it.

Typically, the various setting parameters in the current setting panel already have values associated with them, either from default settings or from previous user inputted values that had been saved, and these values are displayed in the current setting panel in step S11. Via the input means in the setting panel, the program receives user inputs of various setting values (step S12). In response to a save command from the user (step S13), e.g., when the user presses an OK or save button on the panel, the current values including newly inputted or modified values are saved as the current setting (step S14). Preferably, the current values are saved with a time stamp. Meanwhile, the previous setting values originally displayed in step S11, before they are changed by step S12, are kept by the program as a historical snapshot of the setting panel (step S14). In terms of implementation, steps S14 does not require re-writing the previous values into the memory because they already exist in the memory; this step can be implemented by keeping the previous setting values (along with its time stamp) in the memory and re-designating them a historical snapshot, while saving the new values (with the time stamp) in the memory and designating them as the current setting values. In conventional methods of handling setting panels, the new setting values would replace the previous values and the previous values would be overwritten or lost. In the instant method, both the previous setting values and the new setting values are saved.

The newly saved values in step S14, representing the current settings of the setting panel, can then be used to control aspects of the program (printer driver in the example of FIG. 1A) (step S15).

Figure 3:
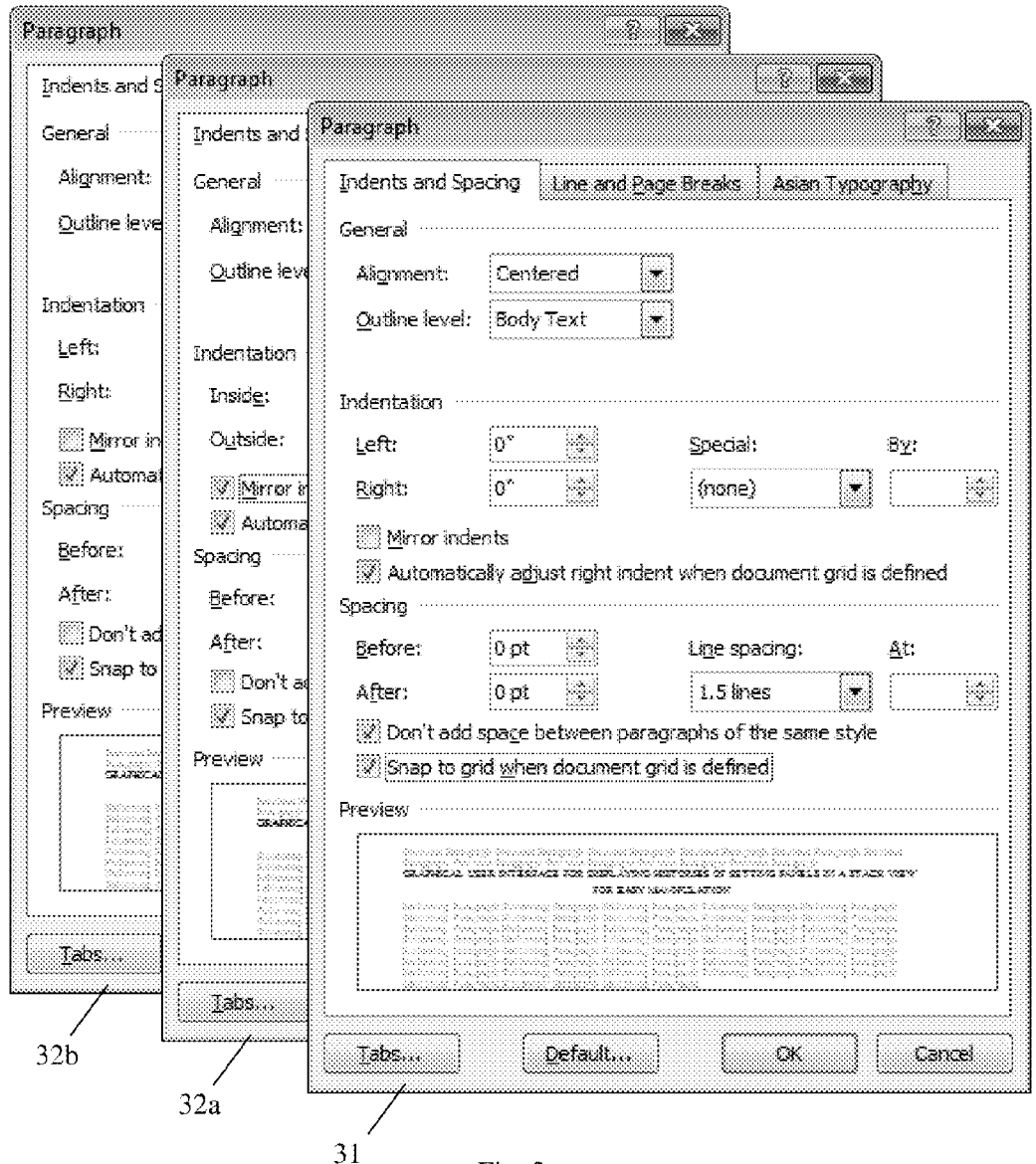
FIG. 3 illustrates an example of a stack of current and historical setting panels displayed on a screen according to an embodiment of the present invention.
Figure 4A:
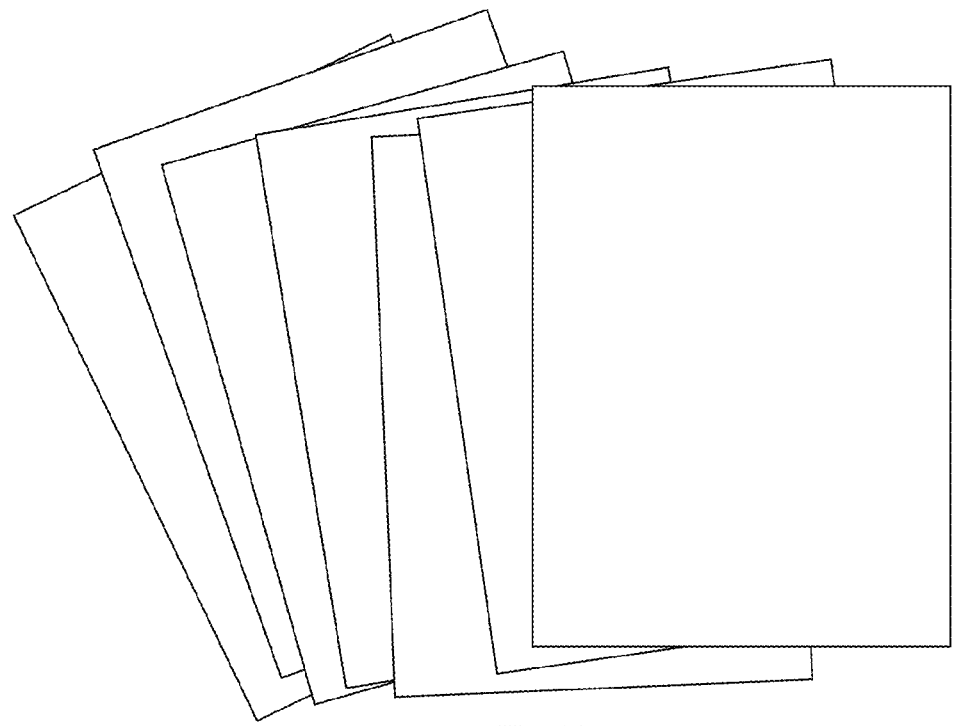
FIGS. 4A and 4B illustrate additional examples of stacks of setting panels.
Figure 4B:
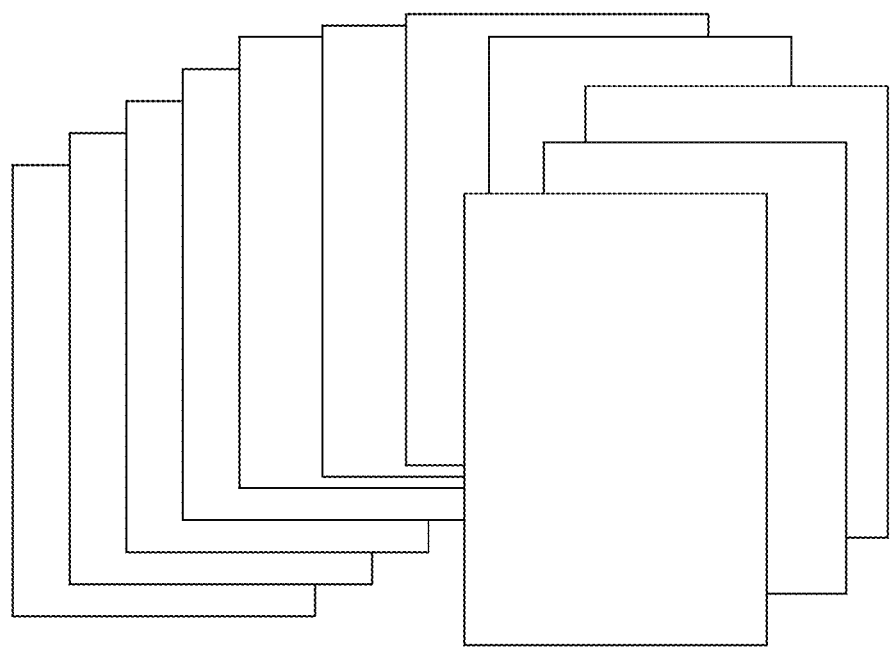

In step S11, the program also displays one or more historical setting panels if they are available. The historical panels are rendered based on historical snapshots saved in step S14 in previous times when the user worked with the setting panel. In one implementation, the one or more historical panels are displayed simultaneously on the screen as a stack, i.e. in a way that simulates the visual effect of a stack of panels. In a stack, the panels are shifted from each other and some panels are obscured by other panels. Some examples of stacks are shown in FIGS. 3, 4A and 4B. These screen displays may be a part of an overall graphical user interface (GUI).

Referring to FIG. 3, when the stack is initially displayed in step S11, the current setting panel 31 is displayed at the top of the stack and its contents is fully visible, and the historical setting panels 32a, 32b, etc. are displayed below the current setting panel, preferably in a chronological order with the more recent ones closer to the top, with their content partially obscured by panels above it.

Figure 5A:
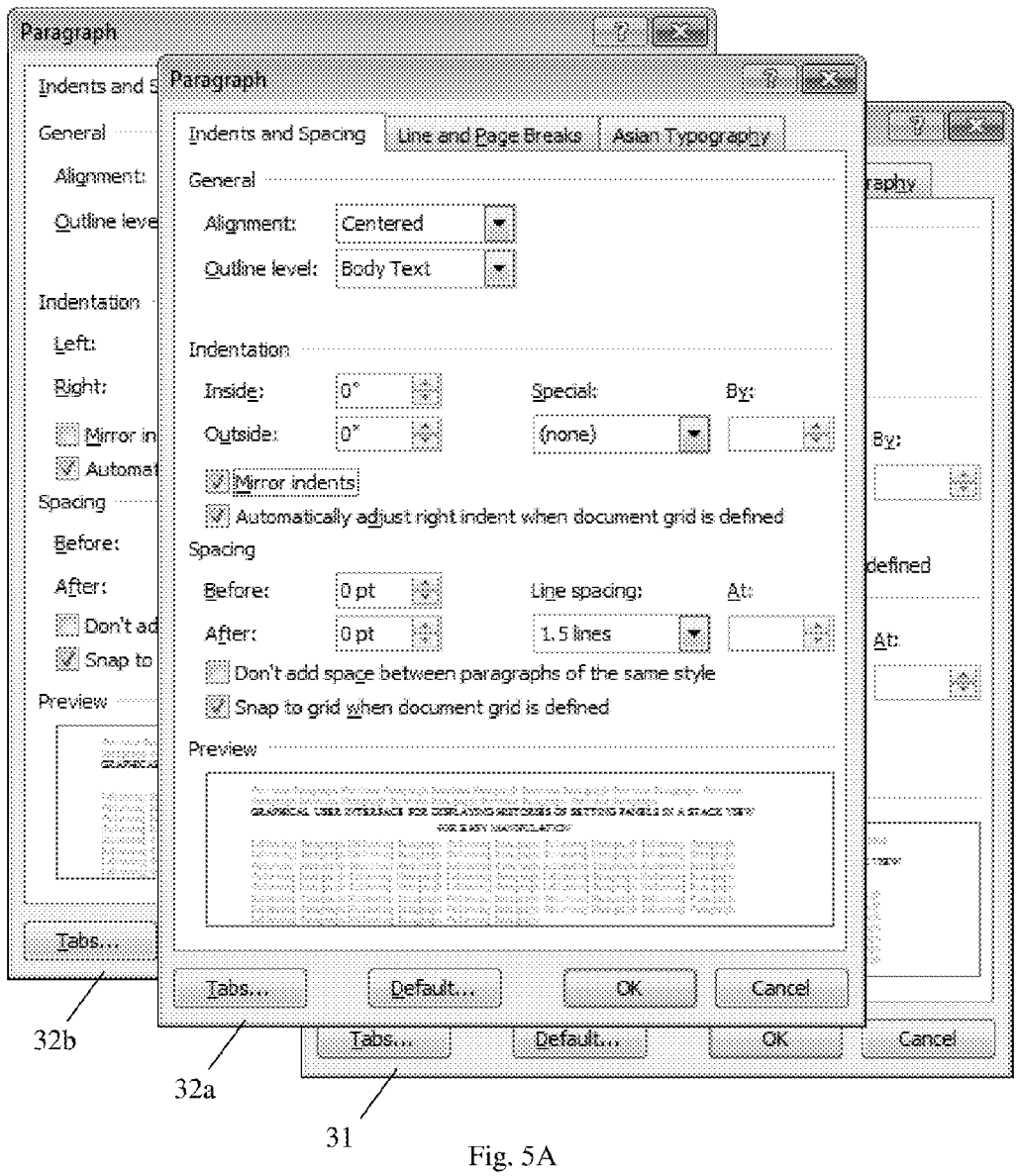
FIGS. 5A-D illustrate examples of selecting one of the panels from the stack of FIG. 3.
Figure 5B:
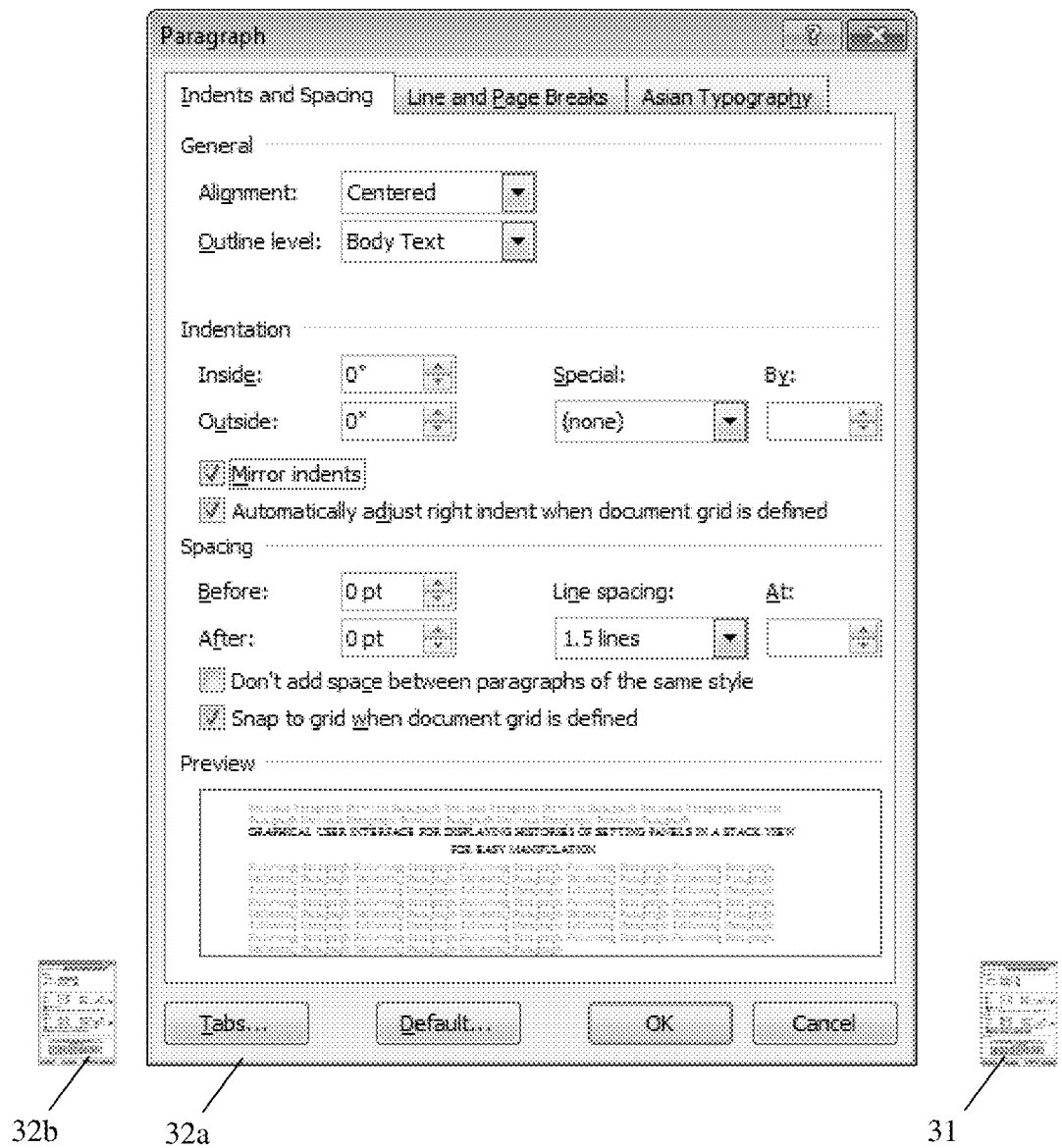
Figure 5C:
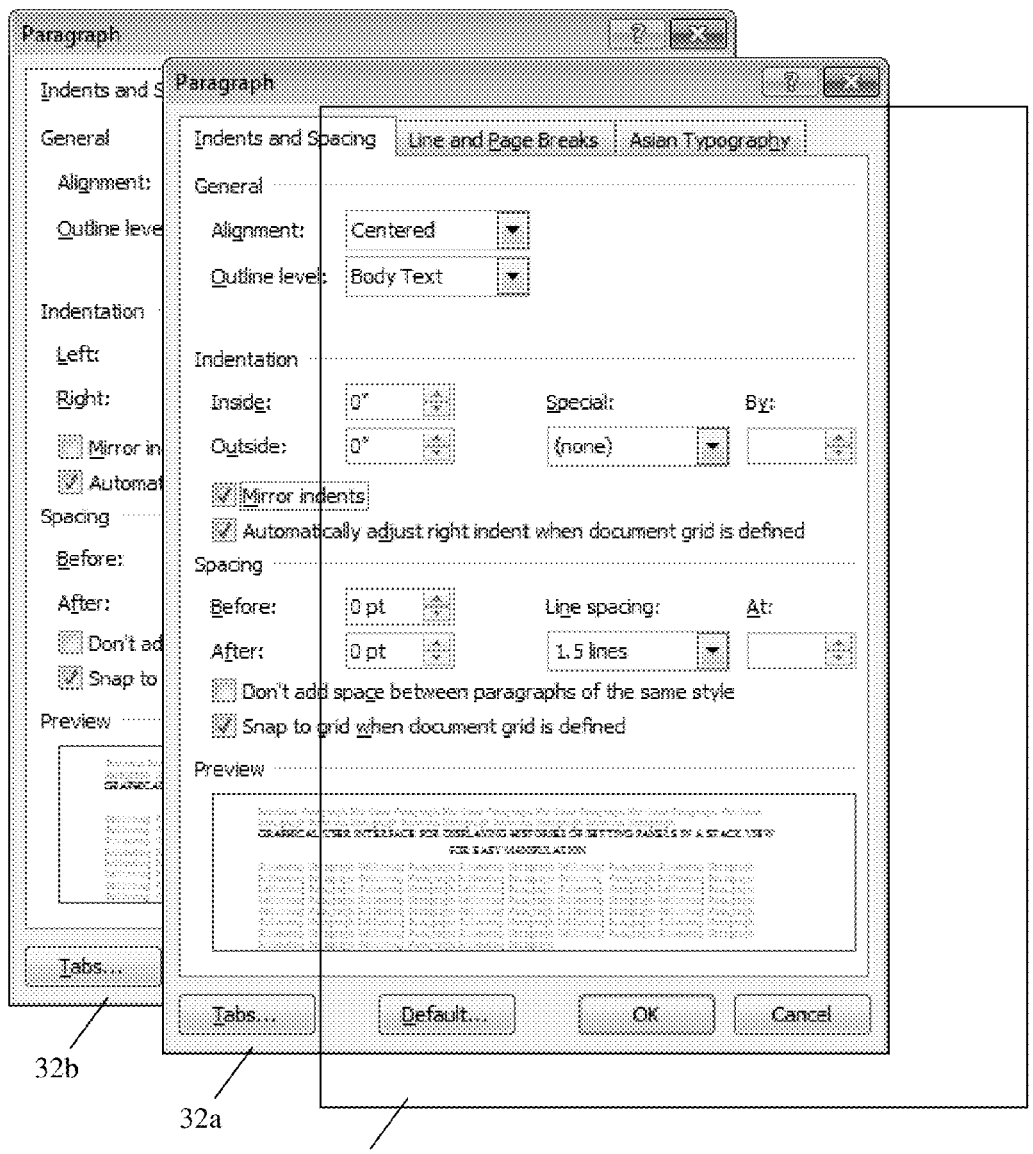
Figure 5D:
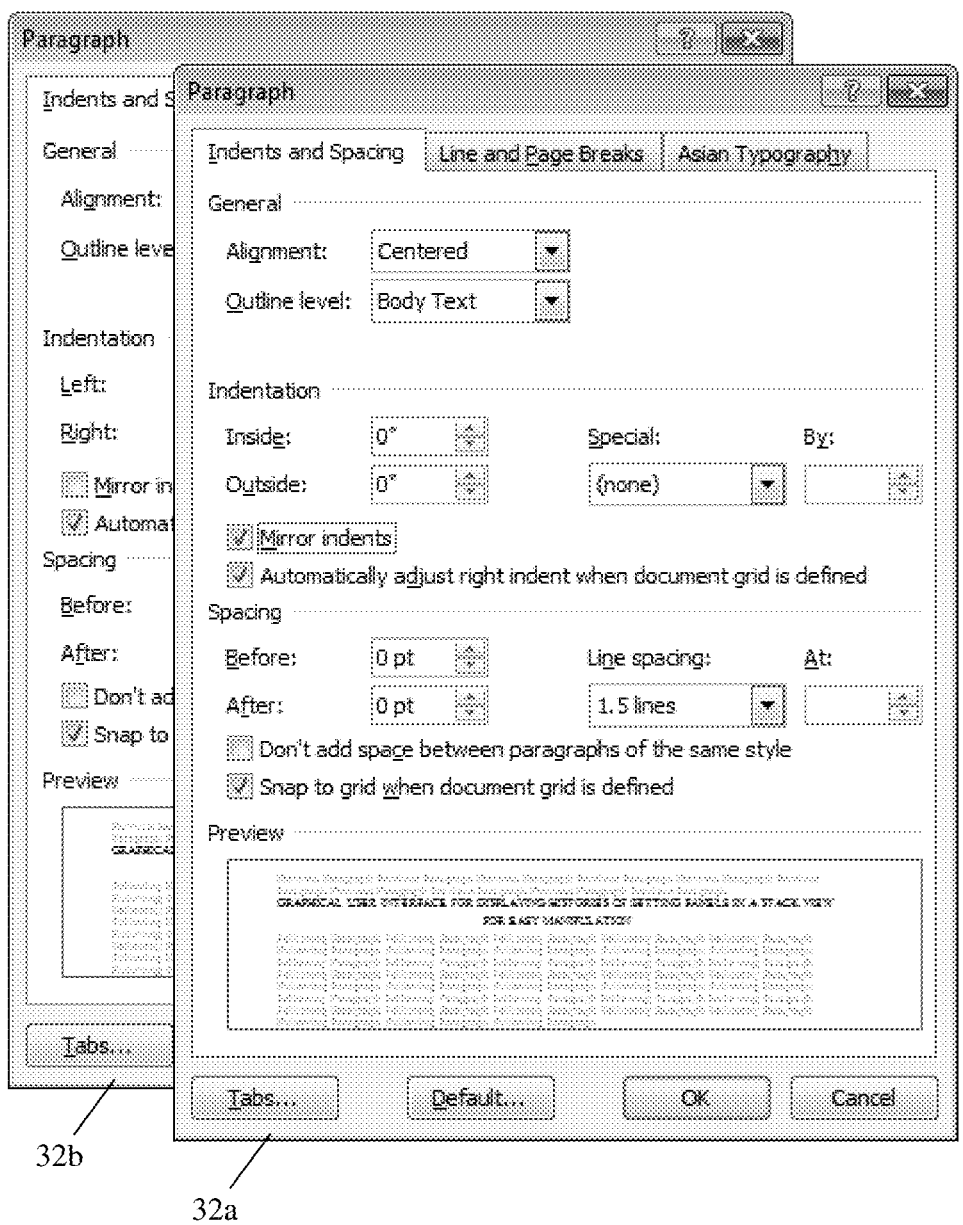

When the multiple setting panels are displayed, the user may interact with the current setting panel located at the top of the stack, as described earlier in step S12. Alternatively, the user may choose to interact with one of the historical setting panels (step S16). This would happen, for example, when the user wishes to use a historical setting as a starting point for new current settings, or to undo some of the changes he made the last time, etc. The user may select one of the historical setting panels 32a, for example, by clicking or double clicking on it or via other navigation tools provided by the GUI. In response to the user's selection, the program redisplays the setting panels to make the selected historical setting panel fully visible (step S17). This may be done in a variety of ways, such as by bringing the selected panel to the front, i.e. making it fully visible while obscuring other panels as necessary but without changing the relative locations of the panels (see FIG. 5A), shrinking the panels above (or both above and below) the selected ones into thumbnails (see FIG. 5B), making all panels above the selected one transparent or semitransparent (see FIG. 5C), or separating the stack into two by placing panels above the selected on in another stack (see FIG. 5D, where the second stack is not shown). In these illustrated examples, historical panel 32s is the selected panel.

By selecting different historical panels, the user may view setting values in any historical panel and ultimately select a desired one he wishes to use as a basis for current settings. Once the desired historical setting panel is selected and fully displayed, the user can interact with it in the same manner as he interacts with the current setting panel in step S12. In other words, the program receives user inputs to modify various setting values via the input means in the selected historical setting panel (step S18).

In an alternative embodiment, when the user selects a historical panel, the program does not always redisplays the setting panels to make the selected historical setting panel fully visible; rather, the program allows the user to interact with some input means of the selected historical panel if they are in fact visible in the stack view. In other words, the redisplay in step S17 is omitted, and step S18 is performed even when the selected panel is not fully visible.

Then, in response to a save command from the user (step S19), the setting values of the selected historic panel, as modified by the user in step S18, are saved as the current setting (step S20). At the same time, the setting values of the selected historical snapshot are kept unchanged by the program (step S20). Step S18 is optional and the user can directly save the settings of the historical panel as current settings without any modification. The current setting values saved in step S20 can then be used to control an application program (step S15).

The user may close the setting panel (the stack), and re-open it at a later time. When it is re-opened, the saved current setting values are displayed in step S11 at the top of the stack.

By saving the setting panel histories, the above described method allows the user to retrieve saved setting values, modify them if desired, and save them as current settings for the program. This provides desired flexibility in setting up and configuring application programs. The method can be applied to any kind of setting panels, as described earlier, but the term "setting panel" does not include windows that are primarily used for displaying contents, such as a window for word processing document, web browser window, etc.

In the example shown in FIG. 3, each historical setting panel is partially obscured, but with at least some of the input means visible. For example, in FIG. 3, the word "Alignment" which is a part of a dropdown list, is visible.

Various display features may be implemented in the setting panel display shown in FIGS. 3-5D to enhance the friendliness of the user interface. In one example, settings that have modified values can be highlighted in the panel display. For example, in the current setting panel, changes made by the user may be highlighted by color coding or other means. As mentioned earlier, when the setting panel is initially displayed in step S11, various setting parameters already have values associated with them in the display, so any changes made by the user in step S12 can be displayed with highlights. For example, if the alignment setting value was initially "Left" and the user changed it to "Centered", the word "Alignment" or "Centered" may be displayed with a red color, or highlighted with a yellow box, etc. Preferably, only the current setting values (e.g. "Centered") are displayed; the previous values (e.g. "Left") are not displayed in the current setting panel (for example, the old values are not displayed with a line through).

In a similar fashion, in each historical setting panel, changes that are present with respect to one or more next panels (more recent in time) and/or one or more previous panels (more distant in time) may be highlighted. For example, if the alignment in the historical panel 32a is changed with respect to the alignment in the panel 32b, the word "Alignment" may be displayed in a red color in the panel 32a. Or, if the outline level in panel 32a is different from the outline level in panel 31 (i.e. panel 31 changed the outline level in panel 32a), the words "Outline level" in panel 32a may be displayed in a blue color. Alternatively, a highlight marker such as a colored dot or colored short line may be placed next to the changed items (for example, to the left of the word "Alignment") to highlight the change. In one example, only changes with respect to the immediate next panel and immediate previous panel are highlighted. In another example, changes relative to two or more next panels and/or two more previous panels are highlighted, in which case different colors may be used to distinguish the changes with respect to different next panels and different previous panels. In one particular example, different shades of the same color (e.f. different shades of blue) are used to highlight changes with respect to multiple previous panels (or multiple next panels) that are progressively farther away in time.

In one implementation, the highlights in a historical panel are displayed only when that panel is selected by the user (e.g., brought to front, etc.). In another implementation, the highlights in a historical panel are displayed (when they are not obscured by other panels) even when the panel is not selected. Preferably, in this case, the highlight markers are placed close to a margin of the historical setting panel such that they are visible even when the panel is partly obscured.

As mentioned earlier, the multiple historical setting panels may be displayed in the stack according to a chronological order with the more recent ones closer to the top. As an alternative, the historical setting panels in the stack may be arranged in an order based on how dissimilar their setting values are to the current setting values, with the more dissimilar ones located closer to the top. Being able to easily recall historical values that are more dissimilar to the current values is helpful because the user can avoid making a large number of changes manually. As another alternative, the multiple historical setting panels in the stack may be arranged in an order based on the number of changes that are present in a panel relative to the panel that immediately precedes it in time. Panels that have a larger number of changes relative to its preceding panel reflect a larger amount of the operator's work leading up to it, and it may be helpful to display such panel closer to the top of the stack so that they can be more easily recalled by the operator.

The number of saved historical setting panels tends to accumulates over time, while the number of panels that can be practically displayed in the stack view is limited. Therefore, some of the historical snapshots need to be deleted. Various strategies may be used to accomplish this. In one example, a predetermined number of historical snapshots will be stored and snapshots are deleted in chronological order. In another example, snapshots are saved in decreasing frequency deeper into history. For example, a first predetermined number of snapshots are saved; beyond that, one in every N snapshots are saved for a second predetermined number of snapshots; beyond that, one in every N*M snapshots are stored, etc. where N and M are integers. In another example, at the end of each day, all changes that occurred in the day are accumulated into one panel and saved as a snapshot, while the other snapshots saved during the day are deleted. In addition, the user is allowed to manually delete historical snapshots.

This stack display shown in FIG. 3-4B is different from simple (conventional) tabs. For example, in a conventional display using tabs, as in the example of FIG. 1A, the inactive tabs are completely obscured, with only the title of the tab showing. In the stack display of FIG. 3, each historical setting panel has at least some input means visible. The display retains the "feel" of the panels even though the lower ones are partially obscured.

The stack display is also different from thumbnails, which are often used to show more pages of documents in a limited display area. Thumbnails are typically too small to be legible, and their contents typically cannot be edited. In the stack display of FIG. 3, the historical setting panels have substantially the same size as the current setting panel and are sized to permit editing. In one implementation, input is permitted directly in a historical setting panel even when it is not selected (e.g. not brought to top, etc.), if an input item such as a check box etc. in the panel is sufficiently unobstructed. This may be implemented, for example, by requiring a double click to select a panel, while a single click within a panel will initiate an input of setting parameter values.

The stack display is also different from stacked windows, for example, windows in a Microsoft® Windows® or other operating system environment. In the Windows® environment, the multiple open windows can be stacked, but these windows do not contain multiple historical setting panels.

Figure 6:
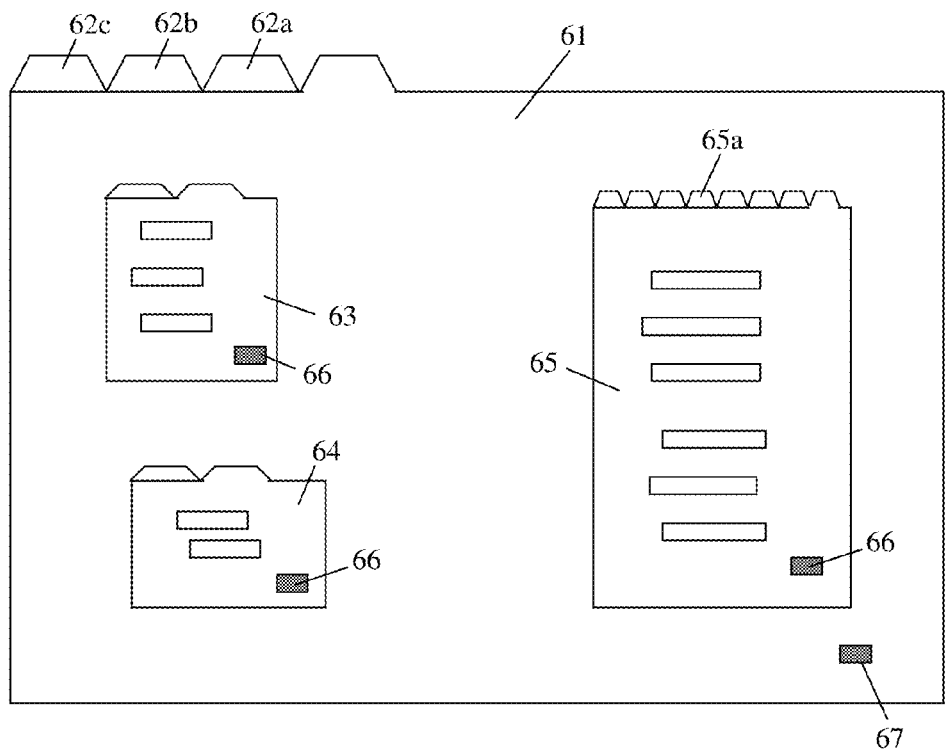
FIG. 6 illustrates an example of a setting panel display according to another embodiment of the present invention.

FIG. 6 illustrates a setting panel display according to another embodiment of the present invention. The layout of the setting panel is more complicated than that shown in FIG. 3, but the way the historical snapshots are used is generally similar to that shown in FIG. 2. The display in FIG. 6 includes a plurality of main setting panels 61 and 62*a-c* arranged in a tab view. The main panel 61 is a current setting panel, and the main panels 62*a-c* are historical snapshots of the setting panel. In the tab view, the content of one of the panels is fully displayed, while the content of the other panels are not displayed except for the tab. Each main panel may be selected by, for example, clicking on the corresponding tab that is visible, and the selected panel will be brought to the front to reveal its contents. In the example shown in FIG. 6, the current main panel 61 is located in the front.

Within the current main panel 61, there are a number of sub-panels 63, 64, 65, etc., each containing a plurality of input means such as buttons, check boxes, text input fields, etc., for inputting setting parameter values by the user. Some of the sub-panels have sets of associated historical sub-panels displayed in a tab view, such as sub-panel 65 (a current sub-panel) and the set of historical sub-panels 65*a* shown in FIG. 6. Each historical sub-panel 65*a* is a historical snapshot of the sub-panel 65. In the tab view, the content of one of the sub-panels is fully displayed, while the content of the other sub-panels are not displayed except for the tab. Each sub-panel may be selected by, for example, clicking on the corresponding tab that is visible, and the selected sub-panel will be brought to the front to reveal its contents. In the example shown in FIG. 6, the current sub-panel 65 is located in the front with its content fully displayed.

As shown in FIG. 6, the current sub-panel 65 contains a plurality of input means such as buttons, check boxes, text input fields, etc., for inputting setting parameter values by the user, and a save button 66 for saving the inputted values. The user may use the current and historical sub-panels 65/65*a* in a manner similar to that described above with reference to FIG. 2. For example, when a current sub-panel is displayed containing current setting values already saved in the program, and the user modifies some of the current setting values and clicks the save button 66, the modified setting values will be saved as the current setting of the sub-panel, while the pre-modified values will be re-designated as a historical snapshot of that sub-panel. If the user selects a historical sub-panel, modifies some setting values and then clicks the save button 66, the modified setting values will be saved as the current setting while the historical snapshot is kept unchanged, and the previous current setting values are now designated as a historical snapshot.

Figure 7:
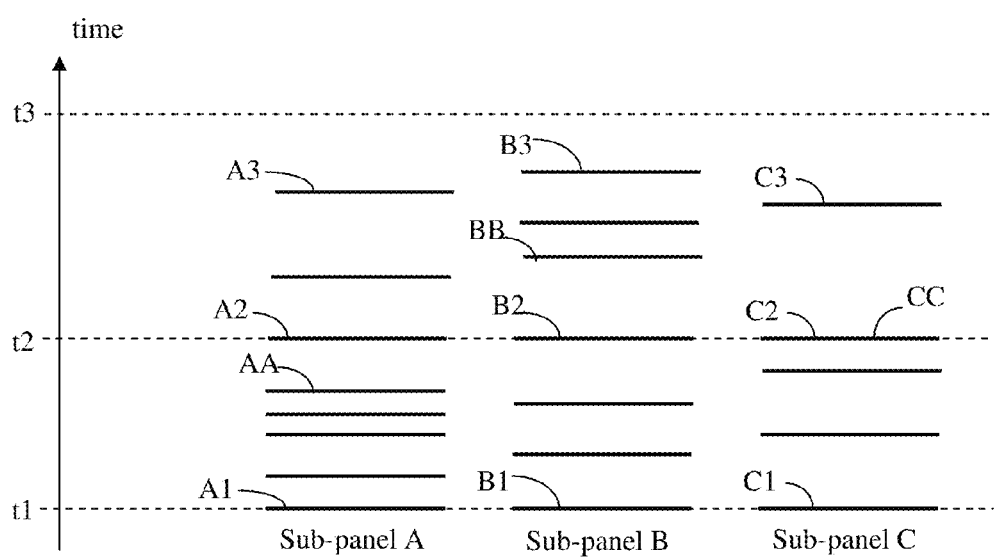
FIG. 7 schematically illustrates a relationship between snapshots of sub-panels and snapshots of the main panel in the example of FIG. 6.

In addition to saving the current setting values in each sub-panel using the sub-panel save button 66, all setting values in the main setting panel including all of the sub-panels can be saved at once, for example by clicking a save button 67 of the main panel. This saving operation saves the current setting values of all sub-panels while re-designating the pre-modified values as historical snapshots of the respective sub-panels. FIG. 7 schematically illustrates the relationship between saving the sub-panels and saving the main panel. In FIG. 7, each solid horizontal line schematically represents saved setting values for a sub-panel (in this example three sub-panels A, B and C are shown), the top line for each sub-panel representing the current setting values and the ones below it being historical snapshots. In this example, at time point t1, setting values of all three sub-panel are saved (A1, B1, C1) by clicking the save button 67 of the main panel. Then, each sub-panel is modified and individually saved a number of times by using the save button 66 of the sub-panels. At time point t2, the main panel is saved again, creating snapshots A2, B2, C2. Then each sub-panel is modified and individually saved a few more times. At the current time t3, the current values of the setting parameters (i.e. the values used to control the software program) are the last saved snapshot for each sub-panel (i.e. A3, B3, C3).

Thus, in one example, when the current main panel 61 displays sub-panels containing current values A3, B3, C3, the user may select historical snapshots for some sub-panels, such as AA, BB, CC (see FIG. 7), bring them to the front, modify the setting parameters in them, and save the modified values as the current setting values. This allows the user to select historical snapshots from different historical times for the different sub-panels and mix them to suit his need.

Each time the main panel is saved (e.g. at time point t2), a historical snapshot of the main panel is created and made available for display as a historical main panel 62a, etc. In terms of implementation, this saving step can be done by saving the current values displayed in each sub-panel as the respective current sub-panel settings (e.g. A2, B2, C2), and saving a set of pointers to the saved current sub-panel settings along with a time stamp for the time point t2.

The display of a historical main panel 62a, etc. is similar in form to the current main panel, but the setting values displayed in it, including in each sub-panel, are historical values for a specified time in history rather than current values. For each sub-panel that has its own saved history, the historical sub-panels are displayed in a tab view, as in the current main panel, but the historical sub-panel corresponding to the specified historical time is displayed at the top and visible. For example, when the historical main panel at time point t2 is recalled and displayed, the historical sub-panels corresponding to historical snapshots A2, B2 and C2 in FIG. 7 will be displayed at the top of their respective stacks.

When the user selects one of the historical main setting panels 62a, etc., it will be displayed in full in the manner described above. The user can modify any setting values in the main setting panel or in any one of its sub-panels. The user can also select another sub-panel from a stack of sub-panels, and then modify its setting values. After modification, the user can save either one or more of the sub-panels or the entire main panel in the manner described above. The historical snapshots of the main panel allow the user to display snapshots of all sub-panels corresponding to a common historical time (e.g. t1, t2, etc.).

It can be seen that in the embodiment shown in FIG. 6, the historical setting information can be recalled in two ways: one way by selecting a historical snapshot of the main panel, the other way by separately selecting a snapshot of each sub-panel. This increases the flexibility of the display and allows the user to more conveniently recall saved historical setting values.

In both the embodiments of FIG. 3 and FIG. 6, in addition to saving the currently setting manually by the user pressing the save or OK buttons, saving may be performed automatically by the program. In one example, each time the user modifies a setting value in the setting panel, a save operation is performed, i.e., the current values are saved as current settings while the pre-modified settings are kept as a historical snapshot. In another example, a save operation is performed every Nth time the user makes modifications. The user may be allowed to set the value N. In another example, certain setting parameters may be deemed important, and a save operation is performed every time such a parameter is modified. The user may be allowed to designate which parameters are deemed important that will trigger a save.

The methods described above can be implemented in a data processing apparatus such as a computer, which includes a processor and a memory or storage device. The data processing apparatus carries out the method by the processor executing computer programs stored in the memory or storage device.

It will be apparent to those skilled in the art that various modification and variations can be made in the setting panel display and manipulation method of the present invention without departing from the spirit or scope of the invention. Thus, it is intended that the present invention cover modifications and variations that come within the scope of the appended claims and their equivalents.

What is claimed is:

1. A method implemented by a computer for manipulating setting parameters, comprising:
   (a) storing in the computer a set of current setting parameters used to control a program, including a first subset of current setting parameters and second subset of current setting parameters;
   (b) storing in the computer a plurality of first subsets of historical setting parameters and a plurality of second subsets of historical setting parameters;
   (c) displaying a current setting panel on a screen, including:
      (c1) displaying a main setting panel;
      (c2) displaying a current first sub-panel within the main setting panel, the current first sub-panel being rendered based on the first subset of current setting parameters and including a plurality of input means for interacting with a user; and
      (c3) displaying a current second sub-panel within the main setting panel, the current second sub-panel being rendered based on the second subset of current setting parameters and including a plurality of input means for interacting with the user;
   (d) in response to a first user input, replacing the display of the current first sub-panel by a display of a historical first sub-panel, the historical first sub-panel being rendered based on a selected one of the plurality of first subsets of historical setting parameters and including a plurality of input means for interacting with the user, wherein the selected first subset of historical setting parameters were saved at one time point and two or more parameters among the selected first subset of historical setting parameters have different values than corresponding parameters among the first subset of current setting parameters;
   (e) in response to a second user input received via the input means of the historical first sub-panel, generating a modified first subset of setting parameters by modifying the selected one of the plurality of first subsets of historical setting parameters based on the second user input;
   (f) in response to a third user input, replacing the display of the current second sub-panel by a display of a historical second sub-panel, the historical second sub-panel being rendered based on a selected one of the plurality of second subsets of historical setting parameters and including a plurality of input means for interacting with the user, wherein the selected one of the plurality of first subsets of historical setting parameters and the selected one of the plurality of second subsets of historical setting parameters correspond to different historical times;

(g) in response to a fourth user input received via the input means of the historical second sub-panel, generating a modified second subset of setting parameters by modifying the selected one of the plurality of second subsets of historical setting parameters based on the fourth user input;

(h1) keeping the first subset of current setting parameters as a new first subset of historical setting parameters, and saving the modified first subset of setting parameters generated in step (e) as a new subset of current setting parameters without saving the modified second subsets of setting parameters generated in step (g);

repeating steps (d) to (g) for additional user inputs;

(h2) keeping the first subset of current setting parameters as a new first subset of historical setting parameters, keeping the second subset of current setting parameters as a new second subset of historical setting parameters, and saving the modified first and second subsets of setting parameters generated in steps (e) and (g) as a new set of current setting parameters; and (i) controlling the program using the new set of current setting parameters.

2. The method of claim 1, further comprising:

(j) in response to a fifth user input, replacing the display of the current setting panel by a display of a historical setting panel, including:

(j1) displaying another main setting panel;

(j2) displaying another historical first sub-panel within the other main setting panel, the other historical first sub-panel being rendered based on another selected one of the plurality of first subsets of historical setting parameters and including a plurality of input means for interacting with a user; and (j3) displaying another historical second sub-panel within the main setting panel, the other historical second sub-panel being rendered based on another selected one of the plurality of second subsets of historical setting parameters and including a plurality of input means for interacting with the user, wherein the other selected one of the plurality of first subsets of historical setting parameters and the other selected one of the plurality of second subsets of historical setting parameters correspond to a same historical time.

* * * * *